United States Patent
Stoiljkovic et al.

(10) Patent No.: US 9,987,786 B2
(45) Date of Patent: Jun. 5, 2018

(54) PRODUCTION OF TPO ROOFING MEMBRANE VIA COUNTER-ROTATING EXTRUSION

(71) Applicant: Dow Global Technologies LLC, Midland, MI (US)

(72) Inventors: Aleksandar Stoiljkovic, Waedenswill (CH); Stefan Ultsch, Staefa (CH); Xiaosong Wu, Sugarland, TX (US)

(73) Assignee: Dow Global Technologies LLC, Midland, MI (US)

( * ) Notice: Subject to any disclaimer, the term of this patent is extended or adjusted under 35 U.S.C. 154(b) by 221 days.

(21) Appl. No.: 14/649,749

(22) PCT Filed: Dec. 23, 2013

(86) PCT No.: PCT/US2013/077450
§ 371 (c)(1),
(2) Date: Jun. 4, 2015

(87) PCT Pub. No.: WO2014/105809
PCT Pub. Date: Jul. 3, 2014

(65) Prior Publication Data
US 2015/0314511 A1   Nov. 5, 2015

(51) Int. Cl.
*B29C 47/40* (2006.01)
*B29C 47/10* (2006.01)
*E04D 5/06* (2006.01)
*B29K 23/00* (2006.01)
*B29K 105/00* (2006.01)
*B29L 31/10* (2006.01)
*B29C 47/00* (2006.01)
*B29B 7/48* (2006.01)
*B29B 7/88* (2006.01)

(52) U.S. Cl.
CPC ........ *B29C 47/402* (2013.01); *B29C 47/0004* (2013.01); *B29C 47/1027* (2013.01); *B29C 47/40* (2013.01); *E04D 5/06* (2013.01); *B29B 7/48* (2013.01); *B29B 7/88* (2013.01); *B29C 47/0019* (2013.01); *B29K 2023/08* (2013.01); *B29K 2023/12* (2013.01); *B29K 2105/0026* (2013.01); *B29K 2105/0085* (2013.01); *B29L 2031/108* (2013.01)

(58) Field of Classification Search
None
See application file for complete search history.

(56) References Cited

U.S. PATENT DOCUMENTS

| | | |
|---|---|---|
| 5,094,058 A | 3/1992 | Slocum |
| 5,504,172 A | 4/1996 | Imuta et al. |
| 6,525,157 B2 | 2/2003 | Cozewith et al. |
| 6,960,635 B2 | 11/2005 | Stevens et al. |
| 7,608,668 B2 | 10/2009 | Li Pi Shan et al. |
| 7,741,397 B2 | 6/2010 | Liang et al. |
| 7,858,706 B2 | 12/2010 | Arriola et al. |
| 7,893,166 B2 | 2/2011 | Shan et al. |
| 7,947,793 B2 | 5/2011 | Marchand et al. |
| 2004/0033741 A1 | 2/2004 | Peng |
| 2005/0011401 A1* | 1/2005 | Bauer .................. C04B 26/045 106/18.11 |
| 2005/0176892 A1 | 8/2005 | Weaver et al. |
| 2006/0199887 A1* | 9/2006 | Liang .................. C08K 3/0033 524/423 |
| 2007/0167575 A1 | 7/2007 | Weaver et al. |
| 2007/0194482 A1 | 8/2007 | Douglas et al. |

FOREIGN PATENT DOCUMENTS

| | | |
|---|---|---|
| WO | 00/01745 A1 | 1/2000 |
| WO | 2004/026957 A1 | 4/2004 |
| WO | 2005/030852 A2 | 4/2005 |
| WO | 2009/080554 A1 | 7/2009 |
| WO | 2009/097565 A1 | 8/2009 |
| WO | 2011/041533 A1 | 4/2011 |
| WO | 2011/138410 A1 | 11/2011 |

OTHER PUBLICATIONS

Potemkin, Physical Review E, 1998, 57(6), pp. 6902-6912.
Dobrynin, J. Chem Phys, 1997, 107(21) pp. 9234-9238.
Williams et al., Polym Sci, Polymer Letters, vol. 6, pp. 621-624 (1968).

* cited by examiner

*Primary Examiner* — Monica Huson
(74) *Attorney, Agent, or Firm* — Husch Blackwell LLP

(57) ABSTRACT

The present disclosure is directed to a process for producing thermoplastic polyolefin roofing membrane. The process includes directly adding components of a high-load flame retardant TPO formulation to a counter-rotating twin screw extruder. The process includes extruding the formulation with counter-rotation of the twin screws and forming a TPO roofing membrane having a tensile strength of greater than 10 MPa and a flame retardance of rating of classification D as measured in accordance with EN ISO 1 1925-2, surface exposure test.

9 Claims, No Drawings

PRODUCTION OF TPO ROOFING MEMBRANE VIA COUNTER-ROTATING EXTRUSION

FIELD

The present disclosure is directed to a process for producing a thermoplastic polyolefin roofing membrane.

BACKGROUND

Thermoplastic polyolefin (TPO) roofing membranes may be a single layer or may be composed of multiple layers and may contain a reinforcing fabric or scrim reinforcement material in the center between two layers of TPO membrane. A single layer of the TPO roofing membrane must exhibit weatherability (durability), flexibility, longevity, flame retardance, UV resistance, and chemical resistance. In addition, TPO roofing membrane must be capable of forming hot-air welded seams. TPO roofing membrane typically has a thickness from 35-90 mils, with the thicknesses of 45 mil, 60, mil, and 80 mil common industry standards.

Conventional TPO roofing membranes are typically produced in a direct extrusion process on co-rotating twin screw extrusion lines. In direct extrusion, the starting materials are directly fed into an extruder, so that the melting, mixing and extrusion occur simultaneously. Co-rotating twin screw extrusion lines provide high throughput combined with mixing that is capable of mixing high loads of granular flame retardant.

Despite the growing attraction for TPO roofing membranes, polyvinyl chloride (PVC) roofing membranes still occupy a significant portion of the roofing market. In contrast to TPO membrane production, PVC roofing membrane is typically produced on counter-rotating twin screw extrusion equipment which is suitable for the processing of polymers characterized by low thermal stability (i.e., PVC).

Counter-rotating twin screw extrusion has its shortcomings when a high-load of filler is involved. Counter-rotating twin screw extrusion does not allow for even dispersion of high-load flame retardant in conventional TPO polymer systems. Pre-compounded starting material for TPO roofing membrane may be run on conventional PVC extrusion lines. However, the additional process step of compounding increases production and labor expenditures making counter-rotation twin screw extrusion a disadvantaged option compared to co-rotating twin screw extrusion. Consequently, manufacturers of PVC roofing membrane are unable to produce TPO roofing membrane on incumbent counter-rotating twin screw extrusion lines.

The art recognizes the need for a process capable of producing TPO roofing membrane on conventional counter-rotating twin screw extrusion platforms. A need further exists for a process to produce TPO roofing membrane without a compounding step and on a counter-rotating twin screw extruder system.

SUMMARY

The present disclosure is directed to a process for producing a TPO roofing membrane.

In an embodiment, the process includes directly adding components of a high-load flame retardant thermoplastic polyolefin (TPO) formulation to a counter-rotating twin screw extruder. The high-load flame retardant TPO formulation includes (i) an olefin block copolymer (ii) a polyolefin and (iii) greater than 30 wt % of a granular flame retardant. The process further includes extruding, with counter-rotation of the twin screws, the components of the high-load flame retardant TPO formulation. The process includes forming a TPO roofing membrane having a tensile strength (CD) greater than 10 MPa and a flame retardance rating of classification D as measured in accordance with EN ISO 11925-2, surface exposure test.

In an embodiment, the process includes directly adding a high-load flame retardant TPO formulation to a counter-rotating twin screw extruder. The high-load flame retardant includes (i) a propylene-based elastomer, (ii) a polyolefin, and (iii) greater than 30 wt % of a granular flame retardant. The process further includes extruding, with counter-rotation of the twin screws, the components of the high-load flame retardant formulation. The process includes forming a TPO roofing membrane having a tensile strength (CD) greater than 10 MPa and a flame retardance rating of classification D as measured in accordance with EN ISO 11925-2, surface exposure test.

An advantage of the present process is that the process enables manufacturers of PVC roofing membrane to produce TPO roofing membrane on conventional counter-rotating twin screw extrusion lines. PVC roofing membrane manufacturers can offer TPO roofing membranes in their product portfolio without the need to invest in new equipment.

An advantage of the present disclosure is the ability to produce conventional PVC membrane and TPO roofing membrane on the same extrusion equipment.

DETAILED DESCRIPTION

A TPO roofing membrane must meet at least the following mechanical properties:
1. a tensile strength (CD and MD) greater than 10 MPa;
2. elongation at break (CD and MD) greater than 500%;
3. E-modulus (CD and MD) less than 100 MPa; and
4. a flame retardance rating of classification D as measured in accordance with EN ISO 11925-2, surface exposure test.

The present disclosure provides a process for producing TPO roofing membrane. In an embodiment, the process includes directly adding components of a high-load flame retardant thermoplastic polyolefin (TPO) formulation to a counter-rotating twin screw (CRTS) extruder. The high-load flame retardant TPO formulation includes at least three components (i) an olefin block copolymer, (ii) a polyolefin, and (iii) greater than 30 wt % of a granular flame retardant. The process includes extruding, with counter-rotation of the twin screws, the components of the high-load flame retardant TPO formulation and forming a TPO roofing membrane having a tensile strength (CD) greater than 10 MPa and a flame retardance a flame retardance rating of classification D as measured in accordance with EN ISO 11925-2, surface exposure test.

Extrusion is a process by which a polymer is propelled continuously along one or more screws through regions of high temperature and pressure where it is melted and compacted and finally forced through a die. The present process utilizes a counter-rotating twin screw extruder. A "counter-rotating twin screw extruder" (or "CRTS extruder"), as used herein, is an extruder with two parallel (or substantially parallel) intermeshing screws, the screws turning or rotating in opposing directions—one screw rotating in a clockwise direction and the other screw rotating in a counterclockwise direction.

The process includes directly adding components of a high-load flame retardant TPO formulation to a counter-rotating twin screw (CRTS) extruder. The term "directly adding," or "direct addition," or "direct extrusion," and like terms is the introduction of starting materials into the CRTS extruder with no prior compounding step.

Known are compounding procedures that entail physical blending devices and that provide dispersive mixing, distributive mixing, or a combination thereof. Such compounding procedures are typically used to prepare homogeneous blends of starting materials prior to introduction into the extruder. Nonlimiting examples of such compounding devices include Brabender mixing devices and Banbury mixing devices.

The present process advantageously avoids the need for a compounding procedure prior to extrusion. In this way, the term "directly adding" excludes the compounding, mixing, or blending of the starting materials prior to CRTS extrusion.

Components of the high-load flame retardant TPO formulation are directly added to the CRTS extruder. The components constitute the starting materials for the extrusion process. The term "high-load flame retardant TPO formulation" is a composition that includes at least one thermoplastic polyolefin, the composition also containing greater than 30 wt % granular flame retardant. In an embodiment, the term "high-load flame retardant TPO formulation" is a composition that includes at least one thermoplastic polyolefin, the composition also containing from 35 wt % or 40 wt %, or 45 wt %, or 50 wt % to 60 wt %, or 65 wt %, or 70 wt %, or 75 wt % granular flame retardant. Weight percent is based on total weight of the high-load flame retardant TPO formulation.

The formulation components may be added simultaneously or sequentially to the CRTS extruder. The formulation components may be added continuously or intermittently to the CRTS extruder. In an embodiment, the formulation is prepared prior to introduction into the CRTS extruder. The formulation components are gathered in the desired proportions. The formulation components are added directly to the CRTS extruder. However, no compounding of the formulation components occurs prior to the addition to the CRTS extruder.

In an embodiment, the addition of the formulation components into the extruder occurs substantially simultaneously (all formulation components added within 0-10 minutes or 0-5 minutes of each other), or simultaneously. The flame retardant is fed into the CRTS extruder through a first port and the polymeric materials are added to the CRTS extruder through a second port. The melting, mixing is performed in a single step. No compounding occurs prior to addition to the CRTS extruder.

1. Olefin Block Copolymer

The present high-load flame retardant TPO formulation includes at least one thermoplastic polyolefin that is an olefin block copolymer. The term "olefin block copolymer" or "OBC" means an ethylene/α-olefin multi-block copolymer and includes ethylene and one or more copolymerizable α-olefin comonomer in polymerized form, characterized by multiple blocks or segments of two or more polymerized monomer units differing in chemical or physical properties. The terms "interpolymer" and "copolymer" are used interchangeably herein. When referring to amounts of "ethylene" or "comonomer" in the copolymer, it is understood that this means polymerized units thereof. In some embodiments, the multi-block copolymer can be represented by the following formula:

Where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows:

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. In some embodiments, the olefin block copolymer may comprise 50 mol % to 90 mol % ethylene, preferably 60 mol % to 85 mol %, more preferably 65 mol % to 80 mol %. For many ethylene/octene block copolymers, the preferred composition comprises an ethylene content greater than 80 mole percent of the whole polymer and an octene content of from 10 to 15, preferably from 15 to 20 mole percent of the whole polymer.

The olefin block copolymer includes various amounts of "hard" and "soft" segments. "Hard" segments are blocks of polymerized units in which ethylene is present in an amount greater than 95 weight percent, or greater than 98 weight percent based on the weight of the polymer, up to 100 weight percent. In other words, the comonomer content (content of monomers other than ethylene) in the hard segments is less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an OBC from 1 weight percent to 99 weight percent of the total weight of the OBC, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the OBC. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-polymers," filed on Mar. 15, 2006, in the name of Colin L. P. Shan, Lonnie Hazlitt, et. al. and assigned to Dow Global Technologies Inc., the disclosure of which is incorporated by reference herein in its entirety. In particular, hard and soft segment weight percentages and comonomer content may be determined as described in Column 57 to Column 63 of U.S. Pat. No. 7,608,668.

The olefin block copolymer is a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In an embodiment, the OBC is produced in a continuous process and possesses a polydispersity index, PDI, from 1.7 to 3.5, or from 1.8 to 3, or from 1.8 to 2.5, or from 1.8 to 2.2. When produced in a batch or semi-batch process, the OBC possesses PDI from 1.0 to 3.5, or from 1.3 to 3, or from 1.4 to 2.5, or from 1.4 to 2.

In addition, the olefin block copolymer possesses a PDI fitting a Schultz-Flory distribution rather than a Poisson distribution. The present OBC has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present olefin block copolymer possesses a most probable distribution of block lengths. In an embodiment, the olefin block copolymer is defined as having:

(A) Mw/Mn from 1.7 to 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2,$$

where d is from 0.850 g/cc, or 0.860, or 0.866 g/cc, or 0.87 g/cc, or 0.880 g/cc to 0.89 g/cc, or 0.91 g/cc, or 0.925 g/cc, and Tm is from 113° C., or 115° C., or 117° C., or 118° C. to 120° C., or 121° C., or 125° C.; and/or (B) Mw/Mn from 1.7 to 3.5, and is characterized by a heat of fusion, $\Delta H$ in J/g, and a delta quantity, $\Delta T$, in degrees Celsius defined as the temperature difference between the tallest DSC peak and the tallest Crystallization Analysis Fractionation ("CRYSTAF") peak, wherein the numerical values of $\Delta T$ and $\Delta H$ have the following relationships:

$$\Delta T > -0.1299\Delta H + 62.81 \text{ for } \Delta H \text{ greater than zero and up to 130 J/g}$$

$$\Delta T > 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular fraction which elutes between 40° C. and 130° C. when fractionated using TREF, characterized in that the fraction has a molar comonomer content greater than, or equal to, the quantity (−0.2013)T+20.07, more preferably greater than or equal to the quantity (−0.2013) T+21.07, where T is the numerical value of the peak elution temperature of the TREF fraction, measured in ° C.; and/or, (E) has a storage modulus at 25° C., G'(25° C.), and a storage modulus at 100° C., G'(100° C.), wherein the ratio of G'(25° C.) to G'(100° C.) is in the range of 1:1 to 9:1.

The olefin block copolymer may also have:

(F) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (G) average block index greater than zero and up to 1.0 and a molecular weight distribution, Mw/Mn greater than 1.3. It is understood that the olefin block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, Col. 31, line 26 through Col. 35, line 44, which is herein incorporated by reference for that purpose.

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8- methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

The olefin block copolymer has a density of from 0.850 g/cc to 0.925 g/cc, or from 0.860 g/cc to 0.88 g/cc or from 0.860 g/cc to 0.879 g/cc. The OBC has a Shore A value of 40 to 70, preferably from 45 to 65 and more preferably from 50 to 65. In an embodiment, the olefin block copolymer has a melt index (MI) from 0.1 g/10 min to 30 g/10, or from 0.1 g/10 min to 20 g/10 min, or from 0.1 g/10 min to 15 g/10 min, as measured by ASTM D 1238 (190° C./2.16 kg). The formulation may comprise more than one olefin block copolymer.

The olefin block copolymers can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. No. 7,608,668; U.S. Pat. No. 7,893,166; and U.S. Pat. No. 7,947,793.

In an embodiment, the olefin block copolymer is an ethylene/octene multi-block copolymer with a density from 0.86 g/cc to 0.88 g/cc, a Tm from 118° C.-120° C., a melt index from 0.5 g/10 min to 5.0 g/10 min., and a Mw/Mn from 1.7 to 3.5.

The olefin block copolymer may comprise two or more embodiments described herein.

2. Olefin-Based Polymer

The high-load flame retardant TPO formulation includes an olefin-based polymer. The olefin-based polymer is different than the olefin block copolymer. The term, "olefin-based polymer," as used herein, refers to a polymer that comprises, in polymerized form, a majority amount of olefin monomer, for example ethylene or propylene (based on the weight of the polymer), and optionally may comprise one or more comonomers.

In an embodiment, the olefin-based polymer is an ethylene-based polymer. The term, "ethylene-based polymer," as used herein, refers to a polymer that comprises, in polymerized form, a majority amount of ethylene monomer (based on the weight of the polymer), and optionally may comprise one or more comonomers. The ethylene-based polymer may be (i) a Ziegler-Natta catalyzed ethylene copolymer comprising repeating units derived from ethylene and one or more $\alpha$-olefins having from 3 to 10 carbon atoms; (ii) a metallocene-catalyzed ethylene copolymer comprising repeating units derived from ethylene and one or more $\alpha$-olefins having from 3 to 10 carbon atoms; (iii) a Ziegler-Natta-catalyzed ethylene homopolymer; (iv) a metallocene-catalyzed ethylene homopolymer; and combinations thereof.

A. Ethylene/$\alpha$-Olefin Copolymer

In an embodiment, the ethylene-based polymer is an ethylene/$\alpha$-olefin copolymer. The term "ethylene/$\alpha$-olefin copolymer," as used herein, refers to a copolymer that comprises, in polymerized form, a majority amount of ethylene monomer (based on the weight of the copolymer), and an $\alpha$-olefin, as the only two monomer types. The ethylene/$\alpha$-olefin copolymer can include ethylene and one or more $C_3$-$C_{20}$ $\alpha$-olefin comonomers. The comonomer(s) can be linear or branched. Nonlimiting examples of suitable comonomers include propylene, 1-butene, 1-pentene, 4-methyl-1-pentene, 1-hexene, and 1-octene. The ethylene/$\alpha$-olefin copolymer can be prepared with either Ziegler-Natta, chromium-based, constrained geometry or metallocene catalysts in slurry reactors, gas phase reactors or solution reactors. The ethylene/$\alpha$-olefin copolymer is a random copolymer and is distinct from the OBC which has a block intra-molecular architecture.

In an embodiment, the ethylene/$\alpha$-olefin copolymer has a density range with a lower limit from 0.90 g/cc, or 0.91 g/cc, or 0.920 g/cc or 0.93 g/cc, to an upper limit of 0.94 g/cc, or 0.950 g/cc, or 0.96 g/cc. In an embodiment, the ethylene/$\alpha$-olefin copolymer has a density from 0.90 g/cc to 0.910 g/cc. In an embodiment, the ethylene/$\alpha$-olefin copolymer has a melt index from 0.5 g/10 min to 5 g/10 min.

In an embodiment, the ethylene/$\alpha$-olefin copolymer has a density from 0.90 g/cc to 0.91 g/cc and a melt index from 1.0 g/10 min to 5.0 g/10 min.

In an embodiment, the ethylene/$\alpha$-olefin copolymer has a density from 0.93 g/cc to 0.95 g/cc and a melt index from 0.5 g/10 min to 1.0 g/10 min.

Nonlimiting examples of suitable ethylene/$\alpha$-olefin copolymer include polyethylene sold under the trade names ATTANE, DOWLEX, or ELITE available from The Dow Chemical Company.

B. Propylene-Based Elastomer

In an embodiment, the olefin-based polymer is a propylene-based elastomer. A "propylene-based elastomer" (or "PBE") comprises at least one copolymer with at least 50 weight percent of units derived from propylene and at least about 5 weight percent of units derived from a comonomer other than propylene, such as ethylene for example.

The PBE is characterized as having substantially isotactic propylene sequences. "Substantially isotactic propylene sequences" means the sequences have an isotactic triad (mm) measured by $^{13}$C NMR of greater than 0.85, or greater than 0.90, or greater than 0.92, or greater than 0.93. Isotactic triads are known in the art and described in, for example, U.S. Pat. No. 5,504,172 and WO 2000/01745, which refer to the isotactic sequence in terms of a triad unit in the copolymer molecular chain determined by $^{13}$C NMR spectra.

The PBE has a melt flow rate (MFR) in the range of from 0.1 to 25 g/10 minutes (min.), measured in accordance with ASTM D-1238 (at 230° C./2.16 Kg). All individual values and subranges from 0.1 to 25 g/10 min. are included and disclosed herein; for example, the MFR can be from a lower limit of 0.1, 0.2, or 0.5, to an upper limit of 25, 15, 10, 8, or 5, g/10 min. For example, PBE that is propylene/ethylene copolymer may have a MFR in the range of 0.1 to 10, or in the alternative, 0.2 to 10, g/10 min.

The PBE has a crystallinity in the range of from at least 1 to 30 wt % (a heat of fusion of at least 2 to less than 50 Joules/gram (J/g)), all individual values and subranges thereof being included and disclosed herein. For example, the crystallinity can be from a lower limit of 1, 2.5, or 3, wt % (respectively, at least 2, 4, or 5 J/g) to an upper limit of 30, 24, 15 or 7, wt % (respectively, less than 50, 40, 24.8 or 11 J/g). For example, PBE that is propylene/ethylene copolymer may have a crystallinity in the range from at least 1 to 24, 15, 7, or 5, wt % (respectively, at least 2 to less than 40, 24.8, 11, or 8.3 J/g). Crystallinity is measured via DSC method, as described below in the test methods section. The propylene/ethylene copolymer comprises units derived from propylene and polymeric units derived from ethylene comonomer and optional $C_4$-$C_{10}$ $\alpha$-olefin. Exemplary comonomers are $C_2$, and $C_4$ to $C_{10}$ $\alpha$-olefins; for example, $C_2$, $C_4$, $C_6$ and $C_8$ $\alpha$-olefins.

In an embodiment, the PBE comprises from 1 wt % to 40 wt % ethylene comonomer. All individual values and subranges from 1 wt % to 40 wt % are included and disclosed herein; for example, the comonomer content can be from a lower limit of 1, 3, 4, 5, 7 or 9, wt % to an upper limit of 40, 35, 30, 27, 20, 15, 12 or 9, wt %. For example, the propylene/ethylene copolymer comprises from 1 to 35 wt %, or, in alternative, from 1 to 30, 3 to 27, 3 to 20, or from 3 to 15, wt %, of ethylene comonomer.

In an embodiment, the PBE has a density from 0.850 g/cc, or 0.860 g/cc, or 0.865 g/cc to 0.900 g/cc.

In an embodiment, the PBE has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such PBE types of polymers are further described in U.S. Pat. Nos. 6,960,635 and 6,525,157, incorporated herein by reference. Such PBE is commercially available from The Dow Chemical Company, under the trade name VERSIFY, or from ExxonMobil Chemical Company, under the trade name VISTAMAXX.

In an embodiment, the PBE is further characterized as comprising (A) between 60 and less than 100, between 80 and 99, or between 85 and 99, wt % units derived from propylene, and (B) between greater than zero and 40, or between 1 and 20, 4 and 16, or between 4 and 15, wt % units derived from ethylene and optionally one or more $C_{4-10}$ α-olefin; and containing an average of at least 0.001, at least 0.005, or at least 0.01, long chain branches/1000 total carbons, wherein the term long chain branch refers to a chain length of at least one (1) carbon more than a short chain branch, and wherein short chain branch refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches in the propylene/ethylene copolymer interpolymer does not exceed 3 long chain branches/1000 total carbons.

In an embodiment, the PBE copolymer has a melt temperature (Tm) from 55° C. to 146° C.

A nonlimiting example of a suitable propylene/ethylene copolymer is VERSIFY 3300, available from The Dow Chemical Company.

C. Propylene-Based Polymer

In an embodiment, the olefin-based polymer is a propylene-based polymer. The term, "propylene-based polymer," as used herein, refers to a polymer that comprises, in polymerized form, a majority amount of propylene monomer (based on the weight of the polymer), and optionally may comprise one or more comonomers. The propylene-based polymer may be (i) a Ziegler-Natta catalyzed propylene copolymer comprising repeating units derived from propylene and one or more α-olefins having from 2 or 4 to 10 carbon atoms (ethylene is considered an α-olefin for purposes of the present disclosure); (ii) a metallocene-catalyzed propylene/α-olefin copolymer comprising repeating units derived from propylene and one or more α-olefins having from 2, or 4 to 10 carbon atoms; (iii) a Ziegler-Natta-catalyzed propylene homopolymer; (iv) a metallocene-catalyzed propylene homopolymer; and combinations thereof.

In an embodiment, the propylene-based polymer is a propylene impact copolymer. Propylene impact copolymer is a two-phase polymer wherein a discontinuous phase of propylene/ethylene copolymer is dispersed throughout a continuous phase of propylene homopolymer.

The olefin-based polymer may comprise two or more embodiments disclosed herein.

3. Flame Retardant

The high-load flame retardant thermoplastic polyolefin (TPO) formulation includes greater than 30 wt % flame retardant. The flame retardant is a solid in granular form or in powder form. In an embodiment, the high-load flame retardant TPO formulation includes flame retardant at a lower limit of 35 wt %, or 40 wt %, or 45 wt %, or 50 wt % to an upper limit of 55 wt %, or 60 wt %, or 65 wt %, or 70 wt %, or 75 wt %. Weight percent is based on the total weight of the high-load flame retardant TPO formulation.

In an embodiment, the high-load flame retardant TPO formulation includes from 40 wt %, or 45 wt %, or 55 wt %, to 55 wt %, or 60 wt %, or 65 wt % of flame retardant.

In an embodiment, the high-load flame retardant TPO formulation includes greater than 50 wt % flame retardant, or from greater than 50 wt % to 75 wt % flame retardant.

Nonlimiting examples of suitable flame retardant include alumina hydroxide (ATH), magnesium hydroxide (MDH), huntite/hydromagnesite, N- and P-based flame retardants (e.g., melamine-poly(aluminumphosphate) or melamine-poly(zincphosphate)), calcium carbonate, zinc oxide, aluminum silicate, calcium silicate, barium sulfate, titanium dioxide, antimony oxide, titanates, borates, mica, talc, glass (such as glass fiber and glass microspheres), nano-clay, and combinations thereof.

In an embodiment, the flame retardant is halogen-free. A "halogen-free flame retardant" is a flame retardant the is void of halogen atom (F, Cl, Br, I).

The flame retardant may comprise two or more embodiments described herein.

4. Additives

The high-load flame retardant TPO may include one or more optional additives. Suitable additives include, but are not limited to, antioxidants, UV stabilizers, foaming agents, colorants or pigments, and combinations thereof.

In an embodiment, the high-load flame retardant (TPO) formulation includes from 1 wt % to 5 wt % of an additive package. The additive package includes a propylene-based elastomer carrier, a thermal stabilizer, a hindered amine light stabilizer (HALS), and titanium dioxide. The additive package includes from 30 wt % to 40 wt % of the propylene-based elastomer carrier, from 1 wt % to 5 wt % of the thermal stabilizer, from 5 wt % to 15 wt % of the HALS, and from 45 wt % to 55 wt % of titanium dioxide.

The process includes extruding the components of the high-load flame retardant TPO formulation and forming a TPO roofing membrane with a tensile strength greater than 10 MPa (CD), and a flame retardance rating of classification D as measured in accordance with EN ISO 11925-2, surface exposure test. Extrusion occurs by way of counter-rotation of the twin screws at elevated temperature (greater than ambient temperature). In an embodiment, the process includes extruding the high-load flame retardant TPO formulation at a temperature less than 185° C. In a further embodiment, the process includes extruding the high-load flame retardant TPO formulation at a temperature range with a lower limit of 120° C., or 130° C., or 140° C., or 150° C. to an upper limit of 160° C., or 170° C., or 175° C., or 180° C. or less than 185° C.

In an embodiment, the process includes extruding the components of the high-load flame retardant TPO formulation and forming a TPO roofing membrane with a flame retardance rating of classification D as measured in accordance with EN ISO 11925-2 for both the surface exposure test and the edge exposure test.

In an embodiment, the process includes counter-rotating the twin screws at a rotation rate from 15 rotations per minute (rpm), or 20 rpm, or 25 rpm to 30 rpm, or 35 rpm, or 40 rpm.

Applicant surprisingly discovered a formulation composed of solely solid components that unexpectedly works synergistically upon direct addition (no compounding step) to the CRTS extruder to promote homogeneous dispersion of the high-load flame retardant throughout the polymeric components. The present high-load flame retardant TPO formulation and CRTS extruder work synergistically to produce TPO roofing membrane that meets, or exceeds, the mechanical and flame retardant properties of TPO roofing membrane made on co-rotating twin screw extruders.

In an embodiment, the process includes directly adding, to the CRTS extruder, a high-load TPO formulation composed of:
  20 wt % to 50 wt % olefin block copolymer;
  10 wt % to 30 wt % ethylene/α-olefin copolymer; and
  35 wt % to 75 wt % of a flame retardant.

The process further includes forming a TPO roofing membrane having the following properties:
  a tensile strength greater than 10 MPa;
  an elongation at break greater than 500%;
  an E-modulus less than 100 MPa; and
  a flame retardance rating of classification D as measured in accordance with EN ISO 11925-2, for the surface exposure test and the edge exposure test.

In a further embodiment, the TPO roofing membrane has a flame retardance rating of classification D as measured in accordance with EN ISO 11925-2, for the surface exposure test and the edge exposure test.

In an embodiment, the process includes directly adding, to the CRTS extruder components of a high-load flame retardant TPO formulation composed of the following components:
  20 wt % to 40 wt % olefin block copolymer;
  15 wt % to 30 wt % ethylene/α-olefin copolymer having a density from 0.90 g/cc to 0.91 g/cc;
  35 wt % to 60 wt % of a flame retardant; and
  1 wt % to 5 wt % additive.

The process further includes forming a TPO roofing membrane. The TPO roofing membrane has the following properties:
  a tensile strength from greater than 10 MPa to 25 MPa;
  an elongation at break from greater than 500% to 1100%;
  an E-modulus less than 100 MPa; and
  a flame retardance rating of classification D as measured in accordance with EN ISO 11925-2, for the surface exposure test alone, or in combination with the edge exposure test.

The process may comprise two or more embodiments disclosed herein.

5. Process-PBE

The present disclosure provides another process. In an embodiment the process comprises:
  directly adding components of a high-load flame retardant thermoplastic polyolefin (TPO) formulation to a counter-rotating twin screw extruder, the high-load flame retardant TPO formulation comprising
    a propylene-based elastomer (PBE);
    a polyolefin;
    greater than 30 wt % of a granular flame retardant;
  extruding, with counter-rotation of the twin screws, the components of the high-load flame retardant TPO formulation; and
  forming a TPO roofing membrane having
    a tensile strength (CD) greater than 10 MPa, and
    a flame retardance rating of classification D as measured in accordance with EN ISO 11925-2, surface exposure test. The foregoing process is hereafter referred to as "Process-PBE." Process-PBE utilizes PBE, or a blend of PBE and OBC, rather than OBC.

In an embodiment, Process-PBE comprises forming a TPO roofing membrane having a flame retardance rating of classification D as measured in accordance with EN ISO 11925-2, for the surface exposure test and the edge exposure test.

In an embodiment, Process-PBE comprises counter-rotating the twin screws at a rotation rate from 15 rpm to 40 rpm.

In an embodiment, Process-PBE comprises performing the counter-rotating extrusion at a temperature less than 185° C.

In an embodiment, Process-PBE comprises directly adding components of a high-load TPO formulation comprising
  20 wt % to 50 wt % PBE;
  10 wt % to 30 wt % propylene-based polymer;
  35 wt % to 75 wt % of a flame retardant; and
  forming a TPO roofing membrane having
    a tensile strength (CD) greater than 10 MPa;
    an elongation at break greater than 500%; and
    an E-modulus less than 100 MPa. The TPO roofing membrane has a flame retardance rating of classification D as measured in accordance with EN ISO 11925-2 for the surface exposure test, alone or in combination with the edge exposure test.

In an embodiment, Process-PBE comprises directly adding components of a high-load flame retardant TPO formulation comprising
  40 wt % to 60 wt % PBE;
  10 wt % to 15 wt % propylene-based polymer that is a propylene impact copolymer;
  30 wt % to 40 wt % of a flame retardant;
  1 wt % to 5 wt % additive; and
  forming a TPO roofing membrane having
    a tensile strength from greater than 10 MPa to 25 MPa;
    an elongation at break from greater than 500% to 1100%; and
    an E-modulus less than 100 MPa. The TPO roofing membrane has a flame retardance rating of classification D as measured in accordance with EN ISO 11925-2 for the surface exposure test, alone or in combination with the edge exposure test.

The Process-PBE may comprise two or more embodiments disclosed herein.

DEFINITIONS

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of"

excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

TEST METHODS

Melt Index

Melt index (I2) is measured in accordance with ASTM D-1238 (190° C.; 2.16 kg). The result is reported in grams/10 minutes. Melt flow rate (MFR) is measured in accordance with ASTM D-1238 (230° C.; 2.16 kg). The result is reported in grams/10 minutes.

Density

Density is measured in accordance with ASTM D-792.

Flame Retardance

Flame retardance is measured in accordance with EN ISO 11925-2. In the ignitability test EN ISO 11925-2, a specimen is subjected to direct impingement of a small flame. The test specimen of size 250 mm×90 mm is attached vertically on a U-shaped specimen holder. A propane gas flame with a height of 20 mm is brought into contact with the specimen at an angle of 45°. The application point is either 40 mm above the bottom edge of the surface center-line (surface exposure test) or at the center of the width of the bottom edge (edge exposure test). Filter paper is placed beneath the specimen holder to monitor the falling of flaming debris.

Two different flame application times and test durations are used depending on the class of the product. For class E, the flame application time is 15 seconds, and the test is terminated 35 seconds after the removal of the flame. With a flame application time of 30 seconds for classes B, C and D, the maximum duration of the test is 60 seconds after the removal of the flame. The test is terminated earlier if no ignition is observed after the removal of the flame source, or the specimen ceases to burn (or glow), or the flame tip reaches the upper edge of the specimen.

The classification criteria are based on observations whether the flame spread (Fs) reaches 150 mm within a given time and whether the filter paper below the specimen ignites due to flaming debris. In addition, the occurrence and duration of flaming and glowing are observed.

EN ISO 11925-2

| B class | ignition time = 30 sec, 60 sec | Fs ≤ 150 mm |
| C class | ignition time = 30 sec, 60 sec | Fs ≤ 150 mm |
| D class | ignition time = 30 sec, 60 sec | Fs ≤ 150 mm |
| E class | ignition time = 15 sec, 35 sec | Fs ≤ 150 mm |

A specimen meets classification D if the following two conditions are met:
(1) Fs≤150 mm for 60 second test time
(2) No burning droplets Gel Permeation Chromatography (GPC)

Conventional GPC measurements are used to determine the weight-average (Mw) and number-average (Mn) molecular weight of the polymer, and to determine the MWD (=Mw/Mn). "Samples are analyzed with a high-temperature GPC instrument (Polymer Laboratories, Inc. model PL220).

The method employs the well-known universal calibration method, based on the concept of hydrodynamic volume, and the calibration is performed using narrow polystyrene (PS) standards, along with four Mixed A 20 μm columns (PLgel Mixed A from Agilent (formerly Polymer Laboratory Inc.)) operating at a system temperature of 140° C. Samples are prepared at a "2 mg/mL" concentration in 1,2,4-trichlorobenzene solvent. The flow rate is 1.0 mL/min, and the injection size is 100 microliters.

As discussed, the molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, (621) 1968) to derive the following equation:

$$M_{polyethylene} = a*(M_{polystyrene})^b.$$

In this equation, a=0.4316 and b=1.0 (as described in Williams and Ward, *J. Polym. Sc., Polym. Let.*, 6, 621 (1968)). Polyethylene equivalent molecular weight calculations were performed using VISCOTEK TriSEC software Version 3.0.

Differential Scanning Calorimetry (DSC)

Differential Scanning calorimetry (DSC) is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve (peak Tm), and the crystallization temperature ($T_c$) is determined from the first cooling curve (peak Tc).

Elongation at break (cross direction (CD) and machine direction (MD)) is measured in accordance with BS ISO 37 Ed. 2012.

E-Modulus cross direction (CD) and machine direction (MD)) is measured in accordance with BS ISO 37 Ed. 2012.

Tensile Strength (cross direction (CD) and machine direction (MD)) is measured in accordance with BS ISO 37 Ed. 2012.

Some embodiments of the present disclosure will now be described in detail in the following Examples.

EXAMPLES

1. Materials

Materials used in the inventive examples and the comparative samples are provided in Tables 1-3 below. Polymers are typically stabilized with one or more antioxidants and/or other stabilizers.

TABLE 1

Resin materials and properties

| | Type | MI (2.16 kg at 190° C.) | MFR (2.16 kg at 230° C.) | Density, g/cc |
|---|---|---|---|---|
| Versify 3300 | PBE | | 8 | 0.867 |
| Inspire 137 | PP | | 0.75 | 0.900 |
| OBC1 | OBC | 5 | | 0.877 |
| OBC2 | OBC | 0.5 | | 0.877 |
| Attane 4607G | ULDPE | 4 | | 0.904 |
| Hifax CA 10A | PP | | 0.6 | 0.880 |

PP = propylene-based polymer
ULDPE = ultra low density polyethylene

TABLE 2

Flame retardant materials and properties

| | Type | d50, micron | Density, g/cc | Comment |
|---|---|---|---|---|
| Magnifin H5 | MDH | 1.6-2 | 2.35 | Uncoated, finely precipitated |
| Magnifin H5 MV | MDH | 1.6-2 | 2.35 | Propriety surface treatment, finely precipitated |

TABLE 3

Additive package (masterbatch)-composition

| | Type | *Wt % |
|---|---|---|
| Versify 2300 | Carrier resin | 35 |
| Kronos 2220 | TiO2 | 51 |
| Irganox B225 | Thermal stabilizer | 4 |
| Chimasorb 2020 | HALS | 10 |

*Wt % based on total wt masterbatch

2. Direct Addition

Examples 1-7 are examples of the high-load flame retardant TPO formulation. The Reference is a formulation with no flame retardant. Component proportions (in weight percent based on total weight of the formulation) are shown in Table 4.

TABLE 4

Formulations

| Wt % | Versify 3300 | HIFAX CA 10A | Inspire 137 | OBC1 | OBC2 | Attane 4607 | H5 | H5 MV | Additive MB |
|---|---|---|---|---|---|---|---|---|---|
| Example 1 | 47.7 | | 11.9 | | | | 35.8 | | 4.6 |
| Example 2 | | | | 35.8 | | 23.8 | 35.8 | | 4.6 |
| Example 3 | | | | | 37.5 | 25.0 | 37.5 | | |
| Example 4 | | | | | 31.7 | 21.2 | 47.1 | | |
| Example 5 | | | | | 37.5 | 25.0 | | 37.5 | |
| Example 6 | | | | | 31.7 | 21.2 | | 47.1 | |
| Example 7 | | | | | 24.0 | 16.0 | | 60.0 | |
| Reference[1] | | 59.6 | 35.8 | | | | | | 4.6 |

[1]Reference represents conventional TPO formulation.
MB = additive masterbatch

3. Counter-Rotating Extrusion

The formulations (Examples 1-7) are directly added to an AMUT counter-rotating twin screw extruder D=92 mm, L/D=36. The components of the formulations are fed directly into the extruder via two different feeders. The flame retardants are in powder form and fed into the extruder through a powder feeder. The polymer materials are in the form of granules and are fed into the extruder through a separate feeder. The melting, mixing and extrusion is performed in a single step. No compounding step or pre-extrusion step is performed prior to the components being directly added to the counter-rotating twin screw extruder. The formulations of Examples 1-7 are processed through a counter-rotating twin screw extruder under the processing conditions shown in Table 5 below.

TABLE 5

Processing parameters for example 1-7
(Counter-rotating twin screw: D = 92 mm, L/D = 36, die with = 700 mm)

| | Melt T, ° C. | Die P, bars [max 450 bar] | RPM screw [max 48] | Extruder Power, A [max 180 A] | Throughput, kg/h [max 300 kg/h] |
|---|---|---|---|---|---|
| Example 1 | 170 | | 24 | | 180 |
| Example 2 | 171 | 159 | 24 | 62 | 180 |
| Example 3 | 175 | 254 | 24 | 93 | 180 |
| Example 4 | 175 | 277 | 21 | 108 | 180 |
| Example 5 | 171 | 193 | 22 | 69 | 180 |
| Example 6 | 173 | 220 | 22 | 74 | 180 |
| Example 7 | 173 | 230 | 22 | 70 | 180 |

The counter-rotating twin screw extrusion process produces TPO roofing membranes with a thickness of 0.65 mm to 0.75 mm and a width of 700 mm.

TABLE 6

Mechanical performance
(Counter-rotating twin screw: D = 92 mm, L/D = 36, die with = 700 mm)

|  | Tensile strength, CD [MPa] | Tensile strength, MD [MPa] | Elongation at break, CD [%] | Elongation at break, CD [%] | E-Modulus, CD [MPa] | E-Modulus, MD [MPa] | EN ISO 11925-2 Class D (surface) | EN ISO 11925-2 Class D (edge) |
|---|---|---|---|---|---|---|---|---|
| Requirement | >10 | >10 | >500 | >500 | <100 | <100 |  | Indicative |
| Example 1 | 19.0 | 21.0 | 870 | 860 | 76.5 | 89.8 | Pass | Fail |
| Example 2 | 14.3 | 14.3 | 1100 | 985 | 47.3 | 70.0 | Pass | Fail |
| Example 3 | 25.8 | 22.6 | 800 | 750 | 83.7 | 81.4 | Pass | Fail |
| Example 4 | 15.0 | 15.3 | 740 | 695 | 107.4 | 104.8 | Pass | Pass |
| Example 5 | 26.3 | 25.9 | 800 | 650 | 42.7 | 37.7 | Pass | Fail |
| Example 6 | 18.4 | 18.8 | 760 | 735 | 50.5 | 48.7 | Pass | Fail |
| Example 7 | 11.0 | 11.7 | 740 | 725 | 94.5 | 98.0 | Pass | Pass |

Each of Examples 1-7 meets the mechanical properties for TPO roofing membrane. In addition, each of Examples 1-7 meets classification D (class D) for the EN ISO 11925-2 surface exposure test.

Example 4 and Example 7 each meets classification D (class D) for the EN ISO 11925-2 edge exposure test. EN ISO 11925-2 edge exposure test is an indicative test and is more stringent than EN ISO 11925-2 surface exposure test. The edge exposure test is applicable to the end use of the membrane.

For comparison, the formulations of Examples 1-7 and Reference are added to a KrassMafei FEA-LAB-ZE25 co-rotating extruder. Subjected to the co-rotating extruder, the formulations of Examples 1-7 produce respective Comparative Samples 1-7. The Reference is a formulation with no flame retardant. No compounding or pre-extrusion step is performed prior to addition to the co-rotating twin screw extruder. Co-rotation twin screw extrusion is performed under the conditions shown in Table 7.

TABLE 7*

Processing parameters for example 1-7
(Co-rotating twin screw: D = 25 mm, L/D = 40, die with = 200 mm)

|  | Melt T, ° C. | Die P, bars | RPM screw | Throughput, kg/h |
|---|---|---|---|---|
| Comparative Sample 1 | 204 | 73 | 250 | 12 |
| Comparative Sample 2 | 204 | 78 | 250 | 12 |
| Comparative Sample 3 | 207 | 120 | 250 | 12 |
| Comparative Sample 4 | 210 | 145 | 280 | 12 |
| Comparative Sample 5 | 206 | 120 | 280 | 12 |
| Comparative Sample 6 | 208 | 110 | 280 | 12 |
| Comparative Sample 7 | 208 | 120 | 280 | 12 |
| Reference | 208 | 105 | 280 | 12 |

*Table 7 is comparative data

The properties for the TPO roofing membranes produced by way of the processing conditions of Table 7 are shown in Table 8 below.

TABLE 8*

Mechanical performance
(Co-rotating twin screw: D = 25 mm, L/D = 40, die with = 200 mm)

|  | Tensile strength, CD [MPa] | Tensile strength, MD [MPa] | Elongation at break, CD [%] | Elongation at break, CD [%] | E-Modulus, CD [MPa] | E-Modulus, MD [MPa] | EN ISO 11925-2 Class D (surface) | EN ISO 11925-2 Class D (edge) |
|---|---|---|---|---|---|---|---|---|
| Requirement | >10 | >10 | >500 | >500 | <100 | <100 |  | Indicative |
| Comparative Sample 1 | 19.1 | 23.9 | 985 | 580 | 98.7 | 83.8 | Pass | Fail |
| Comparative Sample 2 | 12.5 | 16.7 | 1050 | 580 | 63.2 | 50.4 | Pass | Fail |
| Comparative Sample 3 | 21.1 | 23.2 | 840 | 400 | 85.0 | 64.5 | Pass | Fail |
| Comparative Sample 4 | 16.7 | 16.8 | 790 | 560 | 149.4 | 129.0 | Pass | Pass |
| Comparative Sample 5 | 23.6 | 18.0 | 790 | 470 | 67.0 | 44.9 | Pass | Fail |
| Comparative Sample 6 | 17.1 | 14.4 | 735 | 600 | 65.4 | 59.3 | Pass | Fail |

TABLE 8*-continued

Mechanical performance
(Co-rotating twin screw: D = 25 mm, L/D = 40, die with = 200 mm)

|  | Tensile strength, CD [MPa] | Tensile strength, MD [MPa] | Elongation at break, CD [%] | Elongation at break, CD [%] | E-Modulus, CD [MPa] | E-Modulus, MD [MPa] | EN ISO 11925-2 Class D (surface) | EN ISO 11925-2 Class D (edge) |
|---|---|---|---|---|---|---|---|---|
| Comparative Sample 7 | 11.5 | 12.0 | 710 | 685 | 72.7 | 110.4 | Pass | Pass |
| Reference | 19.3 | 22.3 | 900 | 600 | 91 | 87 | Pass | Fail |

*Table 8 is comparative data

5. Discussion

The present high-load flame retardant TPO formulations surprisingly yield suitable TPO roofing membrane when directly added to a CRTS extrusion process. As shown in Table 6 above, the present process produces TPO roofing membrane that meets the mechanical performance requirements for TPO roofing membrane and also meets classification D of EN ISO 11925-2, surface exposure test alone or in combination with meeting classification D of EN ISO 11925.2, edge exposure test.

Bounded by no particular theory, it is believed the combination of the inventive high-load flame retardant TPO formulation in combination with CRTS extrusion works synergistically to promote dispersion, uniformity, and mechanical properties in order to produce a TPO roofing membrane. The olefin block copolymer and polyolefin polymer system enables uptake of the high-load flame retardant. As such, the present process and high-load flame retardant TPO formulation unexpectedly promote uniform dispersion of the high-load flame retardant under the low shear an low mass temperature conditions present during counter-rotating twin screw extrusion. The good mechanical performance and acceptable flame retardance of the present TPO roofing membranes is the result of homogeneous dispersion of high-load flame retardant particles throughout the OBC/polyolefin polymer matrix.

CRTS extrusion can be performed at a lower temperature (advantageously reducing production cost). CRTS extrusion also operates at a lower screw speed, further reducing energy consumption during production. In addition, the low screw speed and lower extrusion temperature of the present CRTS extruder imparts less shear stress and less heat on the formulation resulting in less component degradation and preservation of desirable membrane properties.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A process comprising:
   directly adding, to the exclusion of a prior compounding step, components of a high-load flame retardant thermoplastic polyolefin (TPO) formulation to a counter-rotating twin screw extruder, the high-load flame retardant TPO formulation comprising
      an ethylene/α-olefin multi-block copolymer;
      a polyolefin;
      greater than 30 wt % of a granular flame retardant;
   extruding, with counter-rotation of the twin screws at a rotation rate from 15 rpm to 40 rpm, the components of the high-load flame retardant TPO formulation; and
   forming a TPO roofing membrane having
      a tensile strength (CD) greater than 10 MPa, and
      a flame retardance rating of classification D as measured in accordance with EN ISO 11925-2, surface exposure test.

2. The process of claim 1 comprising forming a TPO roofing membrane having a flame retardance rating of classification D as measured in accordance with EN ISO 11925-2, edge exposure test.

3. The process of claim 1 comprising performing the counter-rotating extrusion at a temperature less than 185° C.

4. The process of claim 1 comprising directly adding components of a high-load TPO formulation comprising
   20 wt % to 50 wt ethylene/α-olefin multi-block copolymer;
   10 wt % to 30 wt % ethylene/α-olefin copolymer;
   35 wt % to 75 wt % of a flame retardant; and
   forming a TPO roofing membrane having
      a tensile strength (CD) greater than 10 MPa;
      an elongation at break greater than 500%; and
      an E-modulus less than 100 MPa.

5. The process of claim 1 comprising directly adding components of a high-load flame retardant TPO formulation comprising
   20 wt % to 40 wt % ethylene/α-olefin multi-block copolymer;
   15 wt % to 30 wt % ethylene/α-olefin copolymer having a density from 0.90 g/cc to 0.91 g/cc;
   35 wt % to 60 wt % of a flame retardant;
   1 wt % to 5 wt % additive; and
   forming a TPO roofing membrane having
      a tensile strength from greater than 10 MPa to 25 MPa;
      an elongation at break from greater than 500% to 1100%; and
      an E-modulus less than 100 MPa.

6. The process of claim 1 wherein the ethylene/α-olefin multi-block copolymer has a density from 0.860 g/cc to 0.880 g/cc.

7. The process of claim 1 wherein the ethylene/α-olefin multi-block copolymer comprises from 60 mole percent to 85 mole percent ethylene.

8. The process of claim 1 wherein the ethylene/α-olefin multi-block copolymer consists of ethylene and an α-olefin comonomer.

9. The process of claim 1 wherein the ethylene/α-olefin multi-block copolymer is an ethylene/octene multi-block copolymer.

* * * * *